No. 763,767. PATENTED JUNE 28, 1904.
S. J. JOHNSON.
DEVICE FOR MELTING AND APPLYING SEALING WAX.
APPLICATION FILED JAN. 2, 1904.
NO MODEL.
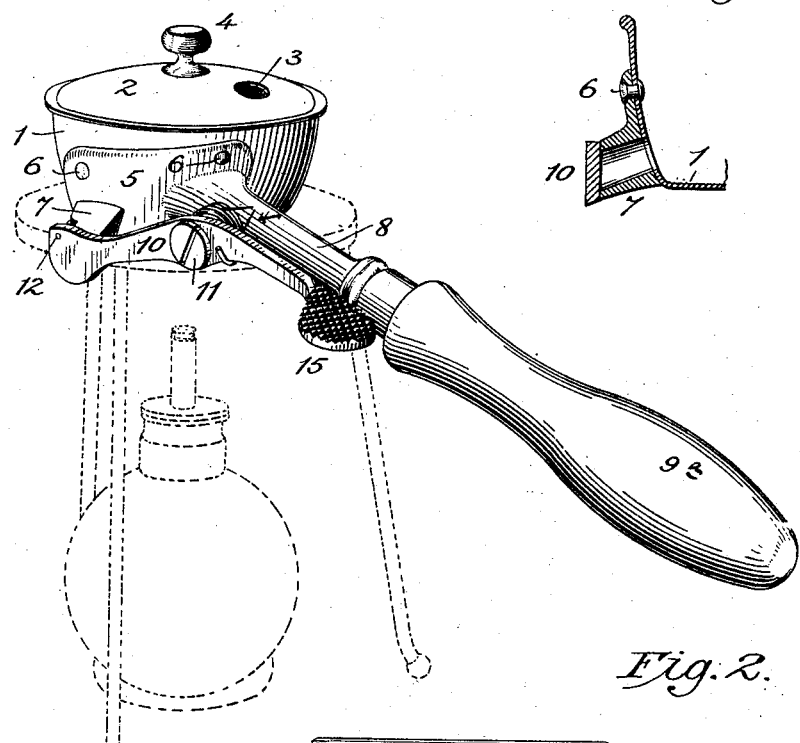
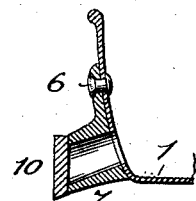
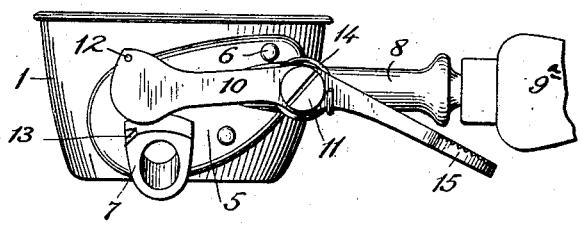
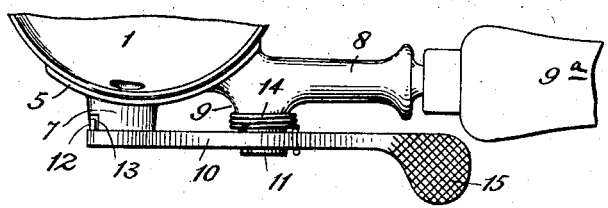

No. 763,767. Patented June 28, 1904.

UNITED STATES PATENT OFFICE.

SAMUEL JOHN JOHNSON, OF TORONTO, CANADA.

DEVICE FOR MELTING AND APPLYING SEALING-WAX.

SPECIFICATION forming part of Letters Patent No. 763,767, dated June 28, 1904.

Application filed January 2, 1904. Serial No. 187,587. (No model.)

*To all whom it may concern:*

Be it known that I, SAMUEL JOHN JOHNSON, a citizen of the Dominion of Canada, residing at Toronto, in the county of York, Province of Ontario, Canada, have invented certain new and useful Improvements in Devices for Melting and Applying Sealing-Wax; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a device for melting sealing-wax preparatory to its application for sealing purposes; and it has for its object to provide a receptacle in which the sealing-wax may be melted and from which it may be permitted to run in its fluid state onto the article to be sealed, the quantity of outflow of melted wax from the receptacle being controlled by a cut-off operating at the point of discharge from the receptacle.

The invention consists in certain features of construction whereby the device can be made at comparatively slight cost and under which the device can be conveniently manipulated and under which there will be no dripping of the melted wax from the receptacle when not in use, all of which features will be hereinafter particularly described, and sought to be specifically defined by the claims, reference being had to the accompanying drawings, forming a part hereof, and in which—

Figure 1 is a perspective of the device with a tripod support and a heating-lamp indicated in dotted lines, the device itself being in full lines. Fig. 2 is a side view of the device with the cut-off opened. Fig. 3 is a plan view of a portion of the device with the cover removed, and Fig. 4 is a sectional view through a portion of the receptacle or cup and the plate provided with the discharge-spout and of the cut-off.

In the drawings, the numeral 1 designates a cup or bowl of any suitable dimensions and provided with a removable cover 2, which is formed with a vent-hole 3 and may have a knob 4. This cup is secured to a plate or casting 5 by rivets 6 or other suitable means, said plate being curved or made with a concave face, so that the circular wall of the cup will fit closely in the concave of the face. The plate is cast of suitable metal and has cast as a part thereof a spout 7 and a handle 8, which latter may be provided with a handle-grip 9ª. From one side of the handle 8 there extends a stud 9, on which is fulcrumed a cut-off lever 10, the same being secured to the stud by a screw 11 or otherwise. The forward portion of this cut-off in its normal position lies closely against the mouth of the spout 7 and is prevented from dropping below the mouth by means of a pin 12, extending from the end of the cut-off and bearing against a shoulder 13, formed in the spout 7 by cutting away a portion thereof. This cut-off is held down in position against the mouth of the spout by means of a spring 14, coiled around the stud 9 and having one end brazed or otherwise secured to the stud and one end bearing against the under side of the cut-off lever, as indicated in Figs. 1, 2, and 3 of the drawings, the end of the lever next to the handle 8 being formed with a roughened finger-piece 15, so that as the device is held in one hand the thumb of that hand may bear upon the finger-piece 15, so as to depress that end of the lever, and thus raise the opposite end of the cut-off from in front of the spout, so that the melted sealing-wax contained within the receptacle or cup may flow therefrom through the spout. When the desired quantity of melted wax has been discharged, the thumb is taken from off the finger-piece 15, and the spring 14 then throws the cut-off into position in front of the spout and effectively cuts off any further outflow of the melted wax. By forming the plate 5, together with the discharge-spout 7 and handle 8, in one piece and providing the same with the cut-off 10 said parts may be made and sold separately from the cup, and the purchaser thereof can apply any desired size of cup that will best suit his purposes. This plate, with its spout and handle, also serves to weight the device at one side of the cup, so that the weight of the sealing-wax within the cup is counterbalanced by the weight of these parts so applied, and consequently the device is handled and manipulated with greater ease than otherwise would be the case.

The device can be made at comparatively little cost and is easily manipulated, and the sealing-wax being melted in bulk and inclosed within the cup can be discharged through the spout in a greater or less quantity, as desired, and the spring-actuated cut-off enables the outflow of the wax to be promptly and effectively cut off, so that as much wax as is desired can be obtained quickly and the supply promptly shut off without any waste.

I have described with particularity the preferred details of construction; but it is obvious that changes can be made and essential features of my invention be retained.

Having described my invention and set forth its merits, what I claim is—

1. The device for melting sealing-wax consisting of the plate provided with a discharge-spout and handle, the spring-controlled cut-off fulcrumed to the handle, and the cup secured to the plate, substantially as described.

2. A device for melting sealing-wax consisting of the plate provided with the spout and the handle, the stud projecting from the handle, the cut-off lever fulcrumed on said stud, the spring encircling the stud and bearing against the cut-off lever to hold the same in front of the mouth of the spout, and the cup secured to the plate, substantially as described.

3. A device for melting sealing-wax consisting of the plate provided with the spout and handle, the spring-influenced cut-off fitting in front of the mouth of the spout and provided with a pin to bear against a shoulder on the spout to limit the downward movement of the cut-off, and the cup secured to the plate, substantially as described.

In testimony whereof I affix my signature in presence of two witnesses.

SAMUEL JOHN JOHNSON.

Witnesses:
  A. F. LOBB,
  RHODA B. HALL.